(12) United States Patent
Meid

(10) Patent No.: US 10,778,000 B2
(45) Date of Patent: Sep. 15, 2020

(54) ELECTRONIC MOTOR STARTER

(71) Applicant: Eaton Intelligent Power Limited, Dublin (IE)

(72) Inventor: Wolfgang Meid, Muelheim-Kaerlich (DE)

(73) Assignee: EATON INTELLECTUAL POWER LIMITED, Dublin (IE)

( * ) Notice: Subject to any disclaimer, the term of this patent is extended or adjusted under 35 U.S.C. 154(b) by 104 days.

(21) Appl. No.: 16/072,890

(22) PCT Filed: Jan. 27, 2017

(86) PCT No.: PCT/EP2017/051768
§ 371 (c)(1),
(2) Date: Jul. 26, 2018

(87) PCT Pub. No.: WO2017/129743
PCT Pub. Date: Aug. 3, 2017

(65) Prior Publication Data
US 2019/0036327 A1    Jan. 31, 2019

(30) Foreign Application Priority Data

Jan. 28, 2016  (DE) ........................ 10 2016 101 553

(51) Int. Cl.
*H02H 7/08* (2006.01)
*H02H 3/00* (2006.01)
*H02P 1/16* (2006.01)

(52) U.S. Cl.
CPC .......... *H02H 7/0816* (2013.01); *H02H 3/006* (2013.01); *H02H 7/08* (2013.01); *H02P 1/16* (2013.01)

(58) Field of Classification Search
CPC ...... H02H 7/08; H02H 7/0816; H02H 1/0007; H02H 3/006; H02P 1/16; H02P 1/24
See application file for complete search history.

(56) References Cited

U.S. PATENT DOCUMENTS 5,239,954 A * 8/1993 Boegner ............... F02N 11/106
                                                    123/179.3
5,577,890 A * 11/1996 Nielsen ................. F04B 49/065
                                                    318/729

(Continued)

FOREIGN PATENT DOCUMENTS

CN        201307838 Y    9/2009
CN        101826826 A    9/2010
(Continued)

*Primary Examiner* — Thai T Dinh
(74) *Attorney, Agent, or Firm* — Leydig, Voit & Mayer, Ltd.

(57) ABSTRACT

An electronic motor starter has a main switch configured as a semiconductor, forming a semiconductor contactor and having at least one semiconductor switch for switching a phase of a supply of a motor winding, a first connection of each semiconductor switch being connected to a corresponding first main current contact of the motor starter; an auxiliary switch configured as a semiconductor switch and connected between at least one pair of auxiliary contacts of the motor starter; a transducer for measuring currents connected between a second connection of each main semiconductor switch and a corresponding second main power contact of the motor starter; and a controller foe the main and auxiliary switches being powered via motor starter control contacts, for being fed transducer measurement signals, and being configured to control the main and/or auxiliary switch according to the supply via the control contacts and/or according to the transducer measurement signals.

14 Claims, 4 Drawing Sheets

(56) References Cited

U.S. PATENT DOCUMENTS

| | | | |
|---|---|---|---|
| 6,172,472 B1 | 1/2001 | Klingbeil | |
| 7,589,942 B2 * | 9/2009 | Kumfer | H01H 59/0009 |
| | | | 318/474 |
| 8,502,485 B2 * | 8/2013 | Kudanowski | B62D 5/046 |
| | | | 318/254.1 |
| 9,200,608 B2 * | 12/2015 | Neet | F02N 11/08 |
| 2008/0310057 A1 * | 12/2008 | Kumfer | H01H 59/0009 |
| | | | 361/31 |
| 2015/0054429 A1 * | 2/2015 | Hille | H02P 29/00 |
| | | | 318/283 |

FOREIGN PATENT DOCUMENTS

| | | |
|---|---|---|
| CN | 202818183 U | 3/2013 |
| CN | 204333957 U | 5/2015 |
| DE | 4335965 A1 | 4/1995 |
| DE | 19742916 A1 | 4/1999 |
| DE | 10003692 A1 | 8/2001 |
| DE | 102009012942 A1 | 10/2010 |
| DE | 102013111954 A1 | 4/2015 |
| EP | 0817347 A2 | 1/1998 |
| EP | 0817347 A3 * | 3/1998 ........... H02H 7/0816 |
| EP | 1298771 A2 * | 4/2003 ........... H02H 7/0852 |
| EP | 1298771 A2 | 4/2003 |

\* cited by examiner

ELECTRONIC MOTOR STARTER

CROSS-REFERENCE TO PRIOR APPLICATIONS

This application is a U.S. National Stage Application under 35 U.S.C. § 371 of International Application No. PCT/EP2017/051768 filed on Jan. 27, 2017, and claims benefit to German Patent Application No. DE 10 2016 101 553.9 filed on Jan. 28, 2016. The International Application was published in German on Aug. 3, 2017 as WO 2017/129743 A1 under PCT Article 21(2).

FIELD

Embodiments of the present invention relate to an electronic motor starter for electric motors.

BACKGROUND

The German laid-open application DE 43 35 965 A1 describes a combined motor starter with a power switch on the mains side and a series-connected contactor on the load side as well as an electronic unit for measurement, control and monitoring. The two switching devices have mechanical contact systems, and the electronic unit has electronic releases for the motor protection and the short-circuit protection. Due to the electronic releases of the electronic unit, conventional releases, such as bimetallic relays and quick-action releases, can be replaced and elaborate designs for facilitating a short-circuit current release can be avoided. In addition, the electronic overload monitoring allows for wide adjustment and release ranges of the electronic releases.

A three-phase electronic motor starter is described in the German laid-open application DE 10 2013 111 954 A1. The motor starter is realized by means of a contactor with mechanical contacts and a plug-on module with semiconductor switches. The module is used to reduce the very high load of the mechanical switching contacts of the contactor due to the high starting currents occurring particularly, when an electric motor is started. For that purpose, the semiconductor switches of the plug-on module are connected parallel to the switching contacts during the activation and deactivation process of the contactor by means of a corresponding control such that the switching contacts can switch almost without power, thus being subjected to a reduced load. The plug-on module can have an integrated motor protection circuit breaker that has release electronics and one current transformer per phase. On the basis of the output signals of the current transformers, the release electronics control a deactivation of the power supply to the motor and particularly effect a deactivation of the motor power supply in case of excessive currents.

From the German laid-open application DE 10 2009 012 942 A1, a motor starter designed for the use as a ventilator control device is known which has semiconductor switches for switching phases of a three-phase main power supply of the motor windings and a microcontroller as an electronic control unit for the semiconductor switches. In addition, there are transducers present for two of the three phases of the three-phase main power supply, the current measurement signals of which are fed to the microcontroller which, on the basis of the signals, controls the main switches, thus being able to implement a motor protection function.

The German laid-open application DE 197 42 916 A1 teaches a control for electric motors that are integrated particularly in movable and/or hand-operated machines, such as blenders, electric drills, grinders, etc. The control has a semiconductor switch as the main switch and has an overload protection function for the motor, which is based on a measurement of the current consumption of the motor. In addition, specific operating conditions of the motor can be adjusted by means of a potentiometer and a push-button field.

From the German laid-open application DE 100 03 692 A1, a semiconductor-based motor starter with reverse function is known.

SUMMARY

Embodiments of the present invention provide an electronic motor starter having a main switch configured as a power semiconductor, which forms a semiconductor contactor and has at least one semiconductor switch for switching a phase of a main power supply of a motor winding, a first connection of each of the at least one semiconductor switch being connected to a corresponding first main current contact of the motor starter; an auxiliary switch configured as a semiconductor switch and connected between at least one pair of auxiliary contacts of the motor starter; an electronic transducer configured to measure currents of phases of the main power supply, which is connected between a second connection of each of the at least one semiconductor switch of the main switch and a corresponding second main power contact of the motor starter; and an electronic controller for the main switch and the auxiliary switch, which is powered via control contacts of the motor starter, and to which measurement signals of the electronic transducer are fed, and which is configured to control the main switch and/or the auxiliary switch according to the main power supply via the control contacts and/or according to the measurement signals

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
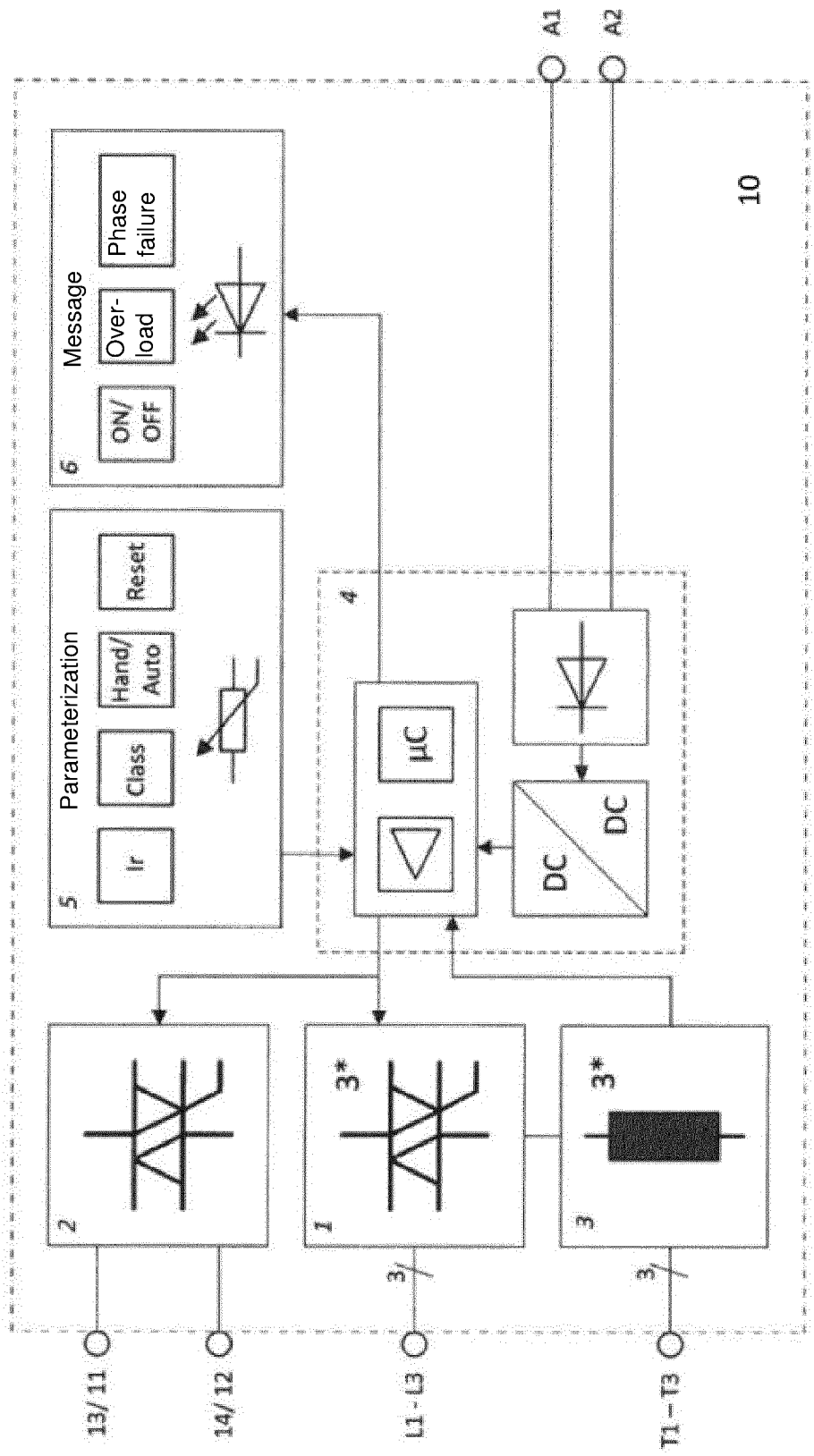
FIG. 1 shows a block diagram of an embodiment of an electronic direct motor starter rich electronic motor protection according to the invention.

Embodiments of the present invention provide an improved motor starter.

Embodiments of the present invention provide an electronic motor starter for electric motors, having a protection and monitoring function but requiring no mechanical components for deactivating the main and auxiliary circuit.

Embodiments of the present invention provide a completely electronic motor starter that can be implemented without mechanical components. According to the invention, a solid-state contactor (semiconductor contactor) configured as a main switch, which forms a power semiconductor, is constructed together with an electronic motor protection relay combined in a housing together with control and monitoring electronics for the solid-state contactor and the motor protection relay. In addition, an auxiliary switch configured as a semiconductor switch and connected between at least one pair of auxiliary contacts of the motor starter is provided.

An embodiment of the invention relates to an electronic motor starter, including a main switch configured as a power semiconductor, which forms a semiconductor contactor and has at least one semiconductor switch for switching a phase of a main power supply of a motor winding. A first connection of each semiconductor switch is connected to a corresponding first main current contact of the motor starter, an auxiliary switch configured as a semiconductor switch and connected between at least one pair of auxiliary contacts of the motor starter, an electronic transducer unit for measuring the currents of the phases of the main power supply, which is connected between a second connection of each semiconductor switch of the main switch and a corresponding second main power contact of the motor starter, and an electronic control unit for the main switch and the auxiliary switch, which is powered via control contacts of the motor starter, and to which measurement signals of the transducer unit are fed, and which is configured to control the main switch and/or the auxiliary switch according to the supply via the control contacts and/or according to the measurement signals. Due to the completely electronic design of such a motor starter, an electronic switching and protecting can be realized for a motor control in a device.

The motor starter can have an electronic messaging unit which is controlled by the control unit and designed to optically and/or acoustically generate messages regarding the status of the motor starter. For example, the messaging unit can control a multicolored LED eight emitting diode), by means of which the different statuses of the motor starter can be signaled optically through different colors and/or blinking.

The motor starter can also have an electronic parameterization unit that is designed to specify at least one parameter for the electronic control unit. The electronic parameterization unit can be designed to specify as parameter for the electronic control unit at least one of the following parameters: A motor nominal current; a class of inertia for an overload release of the power supply of an electric motor; a behavior after an overload release, particularly an automatic or manual reactivation. For example, potentiometers or switches, such as rotary or toggle switches, can be provided for setting parameters.

The electronic transducer unit can have current transducers and/or Hall sensors and/or other suitable measuring instruments for measuring the currents of the phases of the main power supply.

The electronic control unit can be designed to adjust a rated voltage rate of the motor starter on the basis of a supply voltage applied at the control contacts. As a result, a motor starter with a universal input voltage range can be realized.

The main switch configured as a power semiconductor can have a plurality of semiconductor switches that are interconnected as reversing starters. The main switch configured as a power semiconductor can also be designed as a direct starter, having a semiconductor switch for at least one phase of the main power supply of the motor winding. In particular, the main switch configured as a power semiconductor can be designed as a direct starter, having one semiconductor switch for each phase of the main power supply of the motor winding.

In addition, the motor starter can have an interface, by means of which the process data are read out from the motor starter and transmitted to a control center and/or data, particularly parameters for the electronic control unit, can be received.

In order to allow for a compact design of the motor starter, the electronic components of the motor starter can be arranged and wired jointly on a carrier element, for example, a circuit board, or on a plurality of carrier elements that are wired together. A plurality of carrier elements that are wired together can be arranged, for example, in a stacked manner in order to allow for a compact design.

Further advantages and potential applications of the present invention follow for the following description in connection with the embodiments shown in the drawings.

The terms used in the list of reference signs below and the associated reference signs are used in the description, the claims, the abstract, and the drawings.

In the following description, similar, functionally similar, and functionally connected elements can be provided with the same reference sign. Absolute values are only indicated exemplary and are not to be understood to have a limiting effect on the invention.

FIG. 1 shows a block diagram of a three-phase electronic direct motor starter 10 that has the usual connecting contacts:

11-12: Auxiliary contact pair (break contact);
13-14: Auxiliary contact pair (make contact);
L1-L3: (first) main power contacts on the mains side;
T1-T3: (second) main power contacts on the load side; and
A1-A2: Control contacts (coil connections).

The motor starter 10 is completely constructed of electronic components, which are arranged and wired on a circuit board serving as a carrier. The circuit board is accommodated in a housing of the motor starter, the housing having the above-mentioned connection contacts.

As a main switch 1, the motor starter 10 has a solid-state contactor designed as a power semiconductor with a plurality of semiconductor switches, for example, realized through triacs. First connections of these semiconductor switches are connected to the corresponding (first) main power contacts L1-L3 on the mains side of the motor starter 10.

In addition, the motor starter 10 has an auxiliary switch 2 which is configured as a semiconductor switch, for example, as a triac, and is connected between an auxiliary contact pair 11-12 (break contact; in this case, the auxiliary switch 2 is operated as a break contact) or 13-14 (make contact; in this case, the auxiliary switch 2 is operated as a make contact) in order to interrupt or close a signal line connected to the auxiliary contact pair 11-12 or 13-14.

For measuring the currents of the three phases of the main power supply, the motor starter 10 has an electronic transducer unit 3, which, for example, includes current transducers, Hall sensors, or similar transducers. At least one transducer is provided per phase, the transducer being dimensioned for ten times the maximum permissible nominal current of a main current path.

The main switch 1 and the auxiliary switch 2 are controlled by an electronic control unit 4, which is supplied with voltage applied at the control contacts A1 and A2. The applied voltage is first fed to a rectifier circuit. The rectified output voltage of the rectifier circuit is converted by a DC/DC converter into an operating voltage for a microcontroller and driver circuit. A microcontroller µC of the microcontroller and driver circuit executes a firmware stored in its internal permanent memory, which configures the microcontroller µC to process measurement signals of the transducers of the transducer unit 3 and, on the basis of the signals, to control the main switch 1 and the auxiliary switch 2 via the driver circuit, as shall be further described in the following.

The motor starter 10 also has two further elements 5 and 6:

The parameterization unit 5 is provided and designed to specify a motor nominal current "Ir," a class of inertia "Class" for an overload release of the power supply of an electric motor, a behavior "Hand/Auto" after an overload release (automatic or manual reactivation) as parameters for the electronic control unit 4. The manual reactivation is realized with a "Reset" switch, i.e. after an overload release and subsequent cooling phase, the motor can be restarted by means of the "Reset" switch. The parameter "Ir" of the unit 5 and the parameters "Class," "Hand/Auto" are adjusted by means of actuating elements which are configured as rotary switches or potentiometers. A button or a toggle switch can be provided as the "Reset" switch. The microcontroller µC now monitors the motor while taking into account the parameters specified by the parameterization unit 5, and controls the main switch 1 accordingly, i.e. it activates or deactivates semiconductor switches of the main switch 1.

The messaging unit 6 is controlled by the electronic control unit 4 and is used to optically and/or acoustically signal the status of the motor starter. On the basis of the measurement signals of the transducers of the transducer unit 3, the status is determined by the microcontroller through a simulation of the motor warming (temperature simulation) using a model of the motor. For the optical message, the unit 6 has a two-colored LED, by means of which the status can be indicated as follows:

LED off: No supply voltage is applied to the control connections A1 and A2;
LED shines green: Main switch 1 is activated, temperature simulation<100%;
LED blinks red with 1 Hz: 100%<temperature simulation<105%;
LED blinks red with 5 Hz: 105%<temperature simulation<110%;
LED shines red: Temperature simulation<110%, main switch 1 is deactivated, motor is in a cooling phase; and
LED blinks green with 1 Hz: Cooling phase of the motor is completed, from "Reset" reactivation after overload, control center indicated "Hand".

A further LED can be provided in order to indicate a phase failure at a connected load: LED off: No phase failure; and LED yellow: Phase failure.

The motor starter 10 can also have an interface, by means of which the process data can be read out from the motor starter and transmitted to a control center. For example, current measurements, adjustment values, a cause for release, an overload/phase failure, etc. can be read out and transmitted as process data. The interface can also be designed to receive data, for example, parameters for the parameterization unit 5, and so at least some of the parameters described above can be adjusted remotely.

Data-technologically, the interface can be implemented by the microcontroller µC which can have an additional module for coupling the motor starter with a bus system, which, for example, is based on the SmartWire-DT® technology by Eaton Corp, or is a fieldbus bus system according to standard IEC 61158, or is implemented by an Industrial Ethernet. The microcontroller µC can also be configured to master a plurality of bus protocols and use them to send and receive data.

Figure 4:
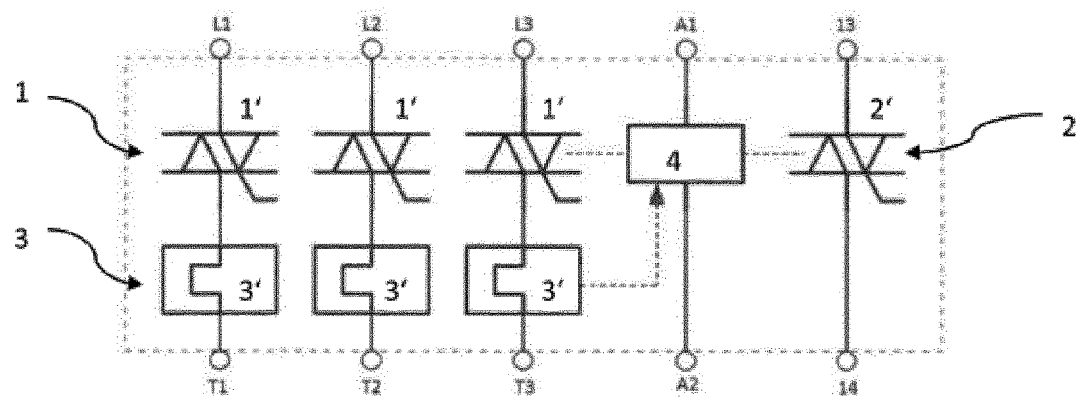
FIG. 4 shows an embodiment of switches and transducers for the electronic direct motor starter according to the invention, where all current paths are switchable.
Figure 5:
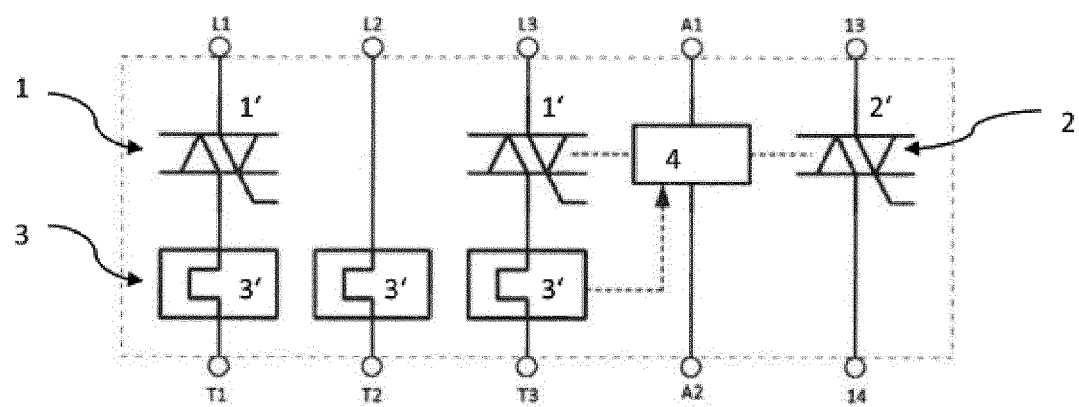
FIG. 5 shows an embodiment of switches and transducers for the electronic direct motor starter according to the invention, where two of three current paths are switchable.

FIGS. 4 and 5 show two embodiments of switches and transducers for the electronic direct motor starter 10.

FIG. 4 shows a main switch 1 with an auxiliary switch 2 and a transducer unit 3, with which all three current paths are switchable by connecting a triac 1' of the main switch 1 to each current path. In addition, a current transducer 3' of the transducer unit 3 is connected to each current path. The auxiliary switch 2 is realized by a triac 2', connected between the auxiliary contact pair 13-14.

FIG. 5 shows an embodiment, in which two of three current paths are switchable by connecting one triac 1' of the main switch 1 to each of the current paths L1-T1 and L3-T3. Otherwise, this embodiment corresponds to the one shown in FIG. 4.

Figure 2:
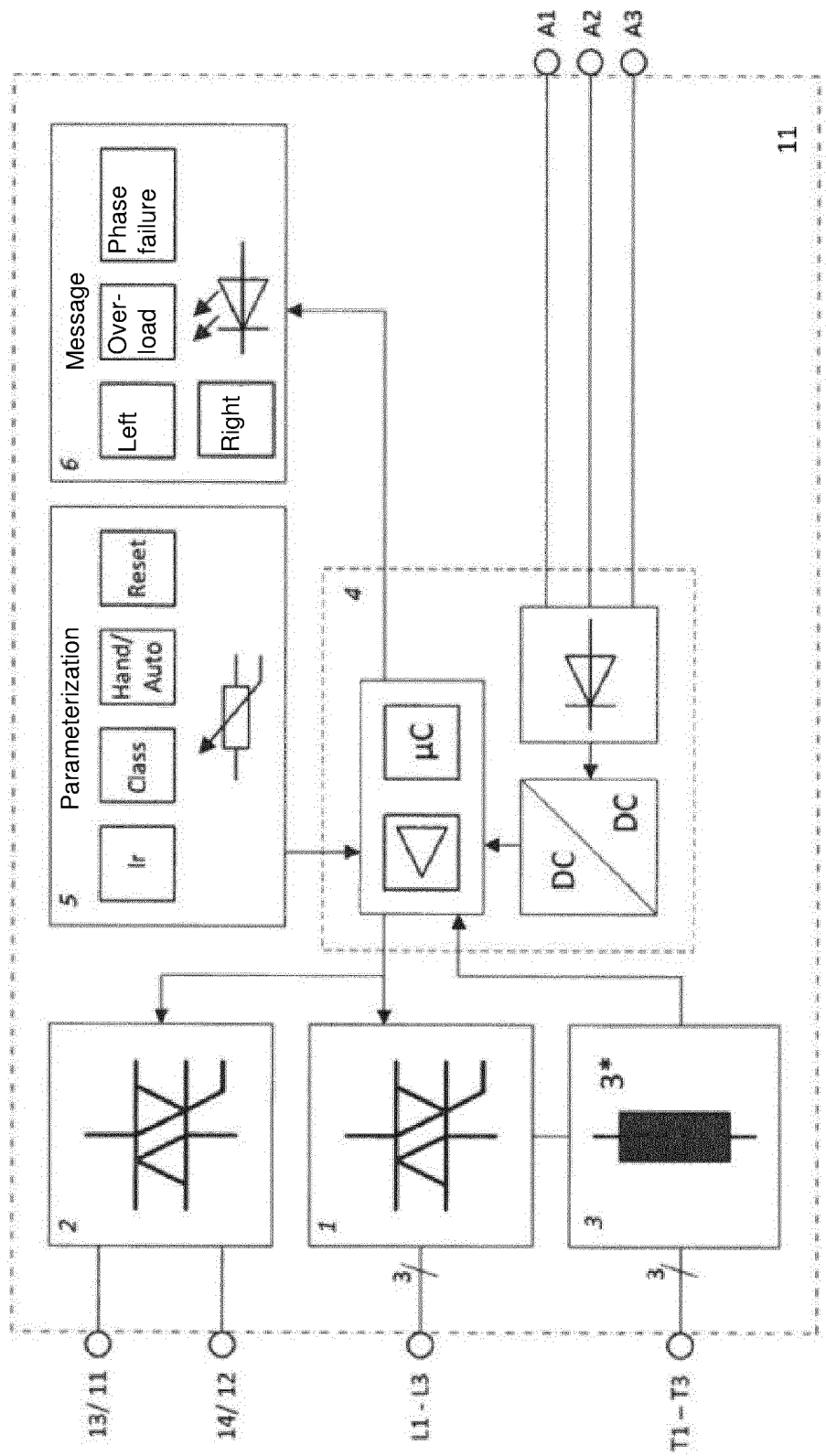
FIG. 2 shows a block diagram of an embodiment of an electronic reversing motor starter with electronic motor protection according to the invention.
Figure 3:
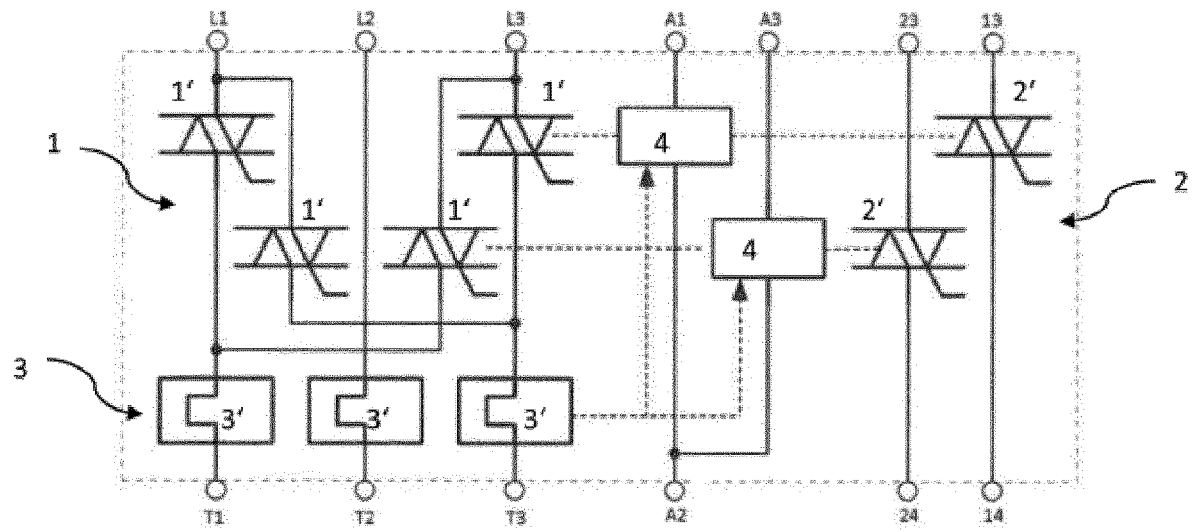
FIG. 3 shows an embodiment of switches and transducers for the electronic reversing motor starter according to the invention.

FIG. 2 shows a block diagram of a three-phase electronic reversing motor starter 11 which differs from the motor starter 10 shown in FIG. 1 in that not only two, but three control contacts (coil connections) A1-A3 are provided and a main switch suitable for a reversing motor starter is additionally used, such as the embodiment of switches and transducers shown in FIG. 3, in which one triac 1' of the main switch 1 is connected to each of the current paths L1-T1 and L3-T3, and one triac 1' of the main switch 1 is additionally connected between the main power contacts L1-T3 and L3-T1. In the embodiment shown in FIG. 3, the auxiliary switch 2 also has two triacs 2', which are connected between the two auxiliary contact pairs 13-14 and 23-24.

The motor starter according to the invention has several advantages including the following.

By joining the two functions "switching and protecting," the costs for production and storage can be reduced. The electronics for the control of the semiconductor switches and the electronics for monitoring the currents of the main current paths can be combined to form an electronic unit.

The motor starter according to the invention allows for a reduction of the wiring expense. In addition, at least one additional auxiliary contact for deactivating the contactor in case of an overload (e.g. break contacts 95-96, make contacts 97-98) can be omitted. Furthermore, no additional wiring for the deactivation of the contactor by the motor protection relay is required. The internal control electronics can replace the additional auxiliary contact and the required external wiring. In case of an overload, the electronics deactivate the semiconductor switching elements (main contacts and the auxiliary switches break, make).

The motor starter according to the invention allows for a simulation of the motor temperature by means of the internally deactivated contactor (semiconductor switch): In the event that the motor starter is disconnected from the supply voltage, a temperature simulation can be stored internally. As a result, the information of the simulated motor temperature is not lost and can also be taken into account after reactivation.

The motor starter according to the invention further allows for providing the connected supply voltage via a DC/DC converter of the internal control electronics (motor protection function and switch function). This allows for a cost-effective design of the measuring device (e.g. current transducer) of the motor starter because it does not have to assume the energy supply of the electronics, which would be the case if the motor protection relay were to be designed as an individual module with external supply.

A multi-voltage power supply can be inserted into the motor starter according to the invention, making it possible to construct a solid-state contactor, including motor protection function, with a supply voltage range from approximately 24 volts to approximately 240 volts. Switch-off limits are determined automatically on the basis of the supply voltage applied at the control contacts A1, A2 (, A3). As a result, the voltages of the motor starter can be reduced from overall approximately four to one single voltage. The motor starter according to the invention can also be designed for a plurality of voltages.

As described in more detail above, embodiments of the invention relate to an electronic motor starter (10), including a main switch (1) configured as a power semiconductor, which forms a semiconductor contactor and has at least one semiconductor switch for switching a phase of a main power supply of a motor winding. A first connection of each semiconductor switch is connected to a corresponding first main current contact (L1-L3) of the motor starter (10), an auxiliary switch (2) configured as a semiconductor switch and connected between at least one pair of auxiliary contacts (11, 12, 13, 14) of the motor starter, an electronic transducer unit (3) for measuring the currents of the phases of the main power supply, which is connected between a second connection of each semiconductor switch of the main switch (1) and a corresponding second main power contact (T1-13) of the motor starter (10), and an electronic control unit (4) for the main switch (1) and the auxiliary switch (2), which is powered via control contacts (A1, A2) of the motor starter (10), and to which measurement signals of the transducer unit (3) are fed, and which is configured to control the main switch (1) and/or the auxiliary switch (2) according to the supply via the control contacts (A1, A2) and/or according to the measurement signals.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An electronic motor starter comprising:
   a main switch configured as a power semiconductor, which forms a semiconductor contactor and has at least one semiconductor switch for switching a phase of a main power supply of a motor winding, a first connection of each of the at least one semiconductor switch being connected to a corresponding first main current contact of the motor starter;
   an auxiliary switch configured as a semiconductor switch and connected between at least one pair of auxiliary contacts of the motor starter;
   an electronic transducer configured to measure currents of phases of the main power supply, which is connected between a second connection of each of the at least one semiconductor switch of the main switch and a corresponding second main power contact of the motor starter; and
   an electronic controller for the main switch and the auxiliary switch, which is powered via control contacts of the motor starter, and to which measurement signals of the electronic transducer are fed, and which is configured to control the main switch and/or the auxiliary switch according to the main power supply via the control contacts and/or according to the measurement signals.

2. The motor starter according to claim 1 comprising a messager that is controlled by the electronic controller and is configured to optically and/or acoustically generate messages regarding a status of the motor starter.

3. The motor starter according to claim 1 comprising an electronic parameterization unit that is configured to specify at least one parameter for the electronic controller.

4. The motor starter according to claim 3, wherein the electronic parameterization unit is configured to specify as a parameter for the electronic controller at least one of the following parameters: a motor nominal current; a class of inertia for an overload release of a power supply of an electric motor; and/or a behavior after an overload release, including an automatic reactivation or a manual reactivation.

5. The motor starter according to claim 1, wherein the electronic transducer has current transducers and/or Hall sensors and/or measuring instruments configured to measure the currents of the phases of the main power supply.

6. The motor starter according to claim 1, wherein the electronic controller is configured to adjust a rated voltage rate of the motor starter on the basis of a supply voltage applied at the control contacts.

7. The motor starter according to claim 1, wherein the main switch has a plurality of semiconductor switches that are interconnected as reversing starters, the plurality of semiconductor switches comprising the at least one semiconductor switch.

8. The motor starter according to claim 1, wherein the main switch is configured as a direct starter, having a semiconductor switch of the at least one semiconductor switch for at least one phase of the phases of the main power supply of the motor winding.

9. The motor starter according to claim 8, wherein the main switch has one semiconductor switch of the at least one semiconductor switch for each phase of the main power supply of the motor winding.

10. The motor starter according to claim 1 comprising an interface configured to read out process data from the motor starter and to transmit to a control center and/or to receive data, including parameters for the electronic controller.

11. The motor starter according to claim 1, wherein electronic components of the motor starter are arranged and wired jointly on a carrier element or on a plurality of carrier elements that are wired together.

12. The motor starter according to claim 1, wherein the control unit is configured to control the main switch to soft start an electric motor and is configured to control the auxiliary switch to operate an auxiliary circuit to interrupt or close a signal line connected to the auxiliary contact pair.

13. The motor starter according to claim 1 configured to deactivate a main circuit and an auxiliary circuit without mechanical components.

14. The motor starter according to claim 13, wherein the auxiliary switch is configured as a break contact or a make contact.

* * * * *